United States Patent

Wolf et al.

[15] 3,652,795

[45] Mar. 28, 1972

[54] TELEPHONE TRANSACTION SYSTEM

[72] Inventors: Arnold M. Wolf, Brooklyn; John G. Richter, Yonkers, both of N.Y.

[73] Assignee: Electrospace Corporation, Westbury, N.Y.

[22] Filed: Nov. 25, 1970

[21] Appl. No.: 92,554

Related U.S. Application Data

[63] Continuation-in-part of Ser. No. 806,446, Mar. 12, 1969, abandoned.

[52] U.S. Cl. ......................179/2 DP, 179/84 VF, 179/2 CA, 235/61.7 B, 340/149

[51] Int. Cl. ......................................................H04m 11/06

[58] Field of Search .........................179/2 R, 2 A, 2 DP, 3, 4; 340/152, 149; 235/61.7 B

[56] References Cited

UNITED STATES PATENTS

| | | | |
|---|---|---|---|
| 3,403,225 | 9/1968 | Mislan | 179/2 R |
| 3,381,276 | 4/1968 | James | 179/2 DP |
| 3,359,369 | 12/1967 | Di Iorio | 179/2 DP |
| 3,526,892 | 9/1970 | Bartlett | 340/365 |
| 3,128,349 | 4/1964 | Boesch | 179/84 UF |
| 3,515,806 | 6/1970 | Spraker | 179/2 DP |
| 3,505,474 | 4/1970 | Quatse | 179/3 |
| 3,517,129 | 6/1970 | Talcott | 179/2 DP |
| 3,308,238 | 3/1967 | Brothman | 235/61.7 B |

*Primary Examiner*—Kathleen H. Claffy
*Assistant Examiner*—Tom D'Amico
*Attorney*—Albert F. Kronman

[57] ABSTRACT

A system is described for buying materials or services by transferring funds in a bank from a buyer's deposit account to a seller's account. The transfer of funds is accomplished by means of a "touch-tone" telephone receiving set equipped with a first decoding and printing means. A computer at the bank receives coded signals from the telephone set and, after decoding the signals, records the transaction at that location. Each purchaser is provided with a secret purchaser number on a telephone operating card and the entire operation is performed in the presence of the purchaser and a representative of the seller or store.

7 Claims, 20 Drawing Figures

INVENTORS
ARNOLD M. WOLF
JOHN G. RICHTER
BY [signature]
ATTORNEY

TELEPHONE TRANSACTION SYSTEM

This invention relates to a method of transferring funds from a depositor's bank account to the bank account of a store or some person or group which is performing a service and is a continuation in part of an application entitled Telephone Transaction System, filed Mar. 12, 1969 Ser. No. 806446 now abandoned.

The invention has particular reference to a means for transferring funds without the use of checks, thereby simplifying the bookkeeping operations, performing the transaction in a few minutes, and eliminating the possibility of overdrawing funds in the depositor's account.

Modern transactions are now generally accomplished by a check which transfers funds from one bank account to another. This method of doing business is convenient for the purchaser but it takes time and the seller does not actually receive credit for his article sold until several days later. In addition, the banks are now swamped with such a large number of checks that they are required to install special electronic equipment to handle the necessary accounting operations. The bookkeeping operations in the bank have been somewhat simplified by the use of magnetic identifying numbers on the check but it is much easier to eliminate the check entirely and provide for an instant transfer of funds from one account to another.

A computer at the bank is connected to one or more telephone lines and information received from the telephone system controls the computer to transfer funds from one account to another. There are many advantages to this type of system. First the transaction is made in a very short time, less than a minute. Second the account of the buyer must have funds in excess of the purchase price, otherwise the purchase cannot be made. This eliminates overdrawn and worthless checks. Third, the seller or the provider of services, knows that his account has been increased by a known amount and he can draw on it immediately. This transaction is not subject to delays of mail delivery nor of other delays which may result from mishandling of the contents of letters and the misinterpretations of amounts on a check.

A feature of the present invention is a tone decoding circuit and a printing unit which may be installed below the usual touch tone receiver set, making the device compact and convenient to handle.

Another feature of the invention is a means for providing the purchaser with a sales ticket which can be used as a receipt. A carbon copy of the sales ticket is also made by the printing unit for the store. If desired, the carbon copy can be put on a portion of a paper roll which includes all the transactions made by this system.

Still another feature of the invention is to arrange a program of a time payments for an article purchased. The time payment program can be rejected by the bank and the seller notified by the transmittal of a code number.

Another feature of the invention is an arrangement whereby the buyer can order wholesale items from a factory.

For a better understanding of the present invention, together with other details and features thereof, reference is made to the following description taken in connection with the accompanying drawings.

GENERAL DESCRIPTION OF THE PREFERRED EMBODIMENT

Figure 5:
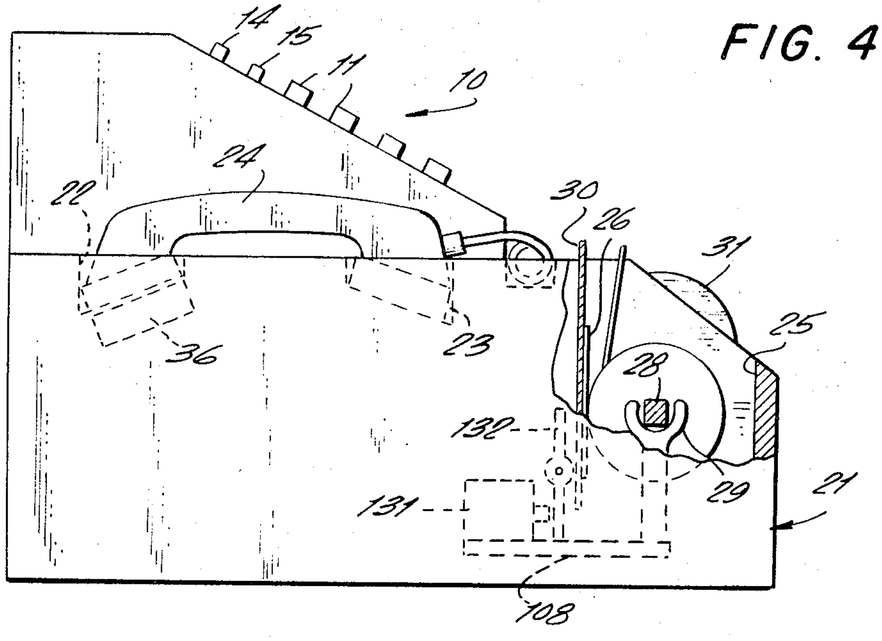
FIG. 5 is a side view, with parts broken away, of the receiver shown in FIG. 1. The receiver has been mounted for inductive coupling.

Referring now to FIG. 5, the receiver circuit includes the usual touch tone receiver unit 10 having digit buttons 11, and control buttons 12 and 13. A slot 14 is provided to receive a punched card for automatic dialing. A start bar 15 is also provided for starting the automatic dialing operation. The two wells 16 at the top of the unit are for storage of punched cards for automatic dialing. In addition to the ten digits in the touch tone array, a space button 17 is provided as is also an "End of Message " button (*) 18. The usual receiver-transmitter 24 is a part of the receiver set for normal conversations between two telephone users.

The touch tone unit 10 is placed on a pickup and printing section 21 which includes two depressions or wells 21 and 23 for accommodating the receiver-transmitter unit 24. Section 21 also includes a well 25 where a printing assembly 19 operates to print a card or ticket 26 which is inserted for receiving digits and symbols from a print wheel 27. The print wheel 27 is slidable, mounted on a square shaft 28 and turned by a motor and reduction gear mounted within the printing section container 21. The card is held in printing alignment by a card tray 30, movable in a vertical direction.

On some models the card 26 includes an original data sheet (see FIG. 2) backed with a sheet of carbon paper and a second sheet for receiving a carbon copy of the original. In other models a roll of paper is mounted within the container 21 and all carbon copies are printed on it. If the roll is used, the store clerk may advance the roll by means of a knurled hand disk 31.

Figures 1, 2:
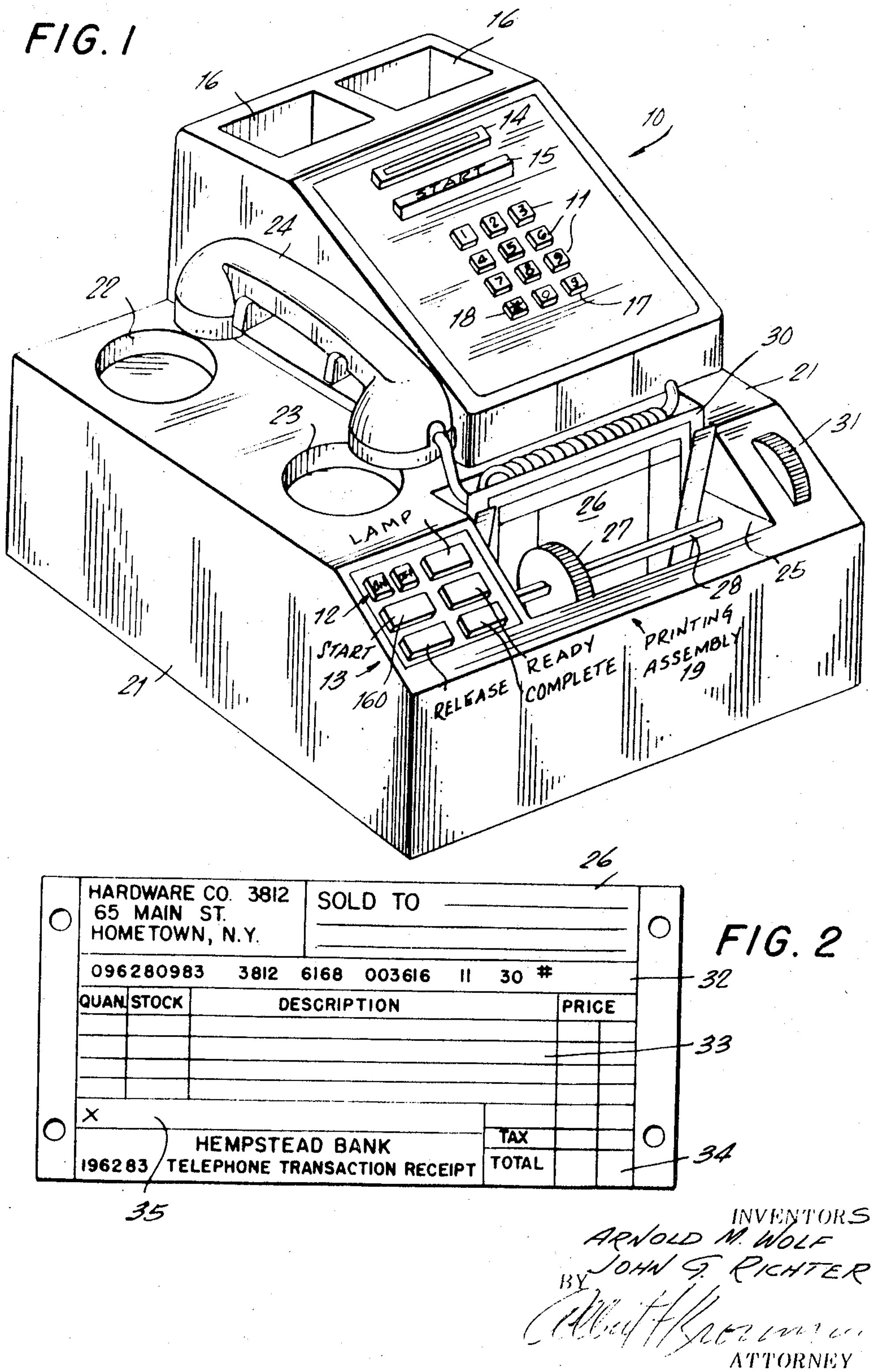
FIG. 1 is an isometric view of the telephone receiver set combined with the tone decoder and printer component.
FIG. 2 is a plan view of a ticket showing the results of the transaction. This ticket includes a purchaser's name entered by the store clerk, the purchaser's signature and a single line of numbers identifying the purchaser, and recording the transaction.

The sales card 26 shown in FIG. 2 is an ordinary data card without holes or embossed surfaces. Most of the data, such as the name of the store and its address, are preprinted on the card. Spaces are reserved for the purchaser's signature and the articles bought. A single line is reserved for the printing of digits which identify the purchaser, his social security number, and the amount of money transferred from one bank account to another. In the card shown in FIG. 2, the name of the store is printed in the upper left hand corner of the card. To the right of this area is a space for printing the customer's name. An area 32 which includes the entire length of the card is for printing the digits from the computer and from the keyboard keys 11 on the unit 10. A fourth area 33 may be reserved for a description of the article bought, its stock number, the number of places, and the price. Also, there is a space 34 for the total and a space 35 for the signature of the purchaser.

Figure 3:
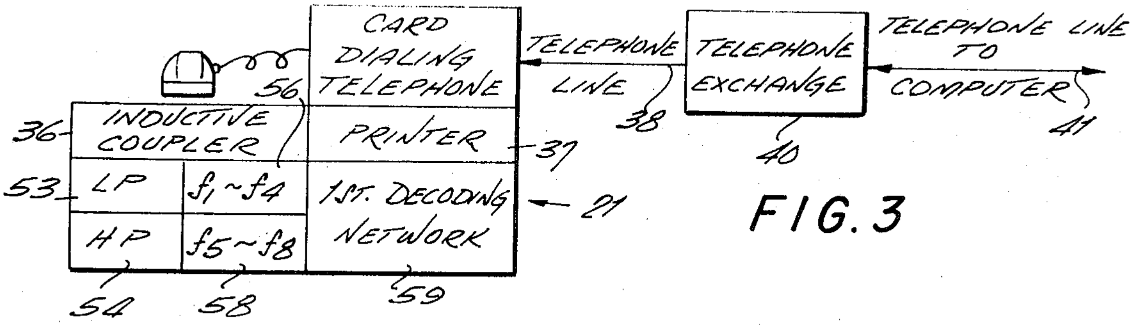
FIG. 3 is a schematic representation of the component parts of the receiver circuit and including the telephone exchange.

FIG. 3 shows the general circuit divisions in the touch tone unit 10 and 21. The card dialing touch-tone telephone 10 is shown with its receiver adjacent to an inductively coupled coil 36 positioned immediately under cavity 22 (FIG. 5). A series of ten filters 53, 54, 56, and 58 separates the tone frequency signals into 16 channels and delivers them to a first decoding circuit 59, shown in detail in FIGS. 6 and 7. The output of the first decoding circuit 59 is connected directly to a printing device which prints all symbols resulting from the touch-tone operation.

Figure 4:
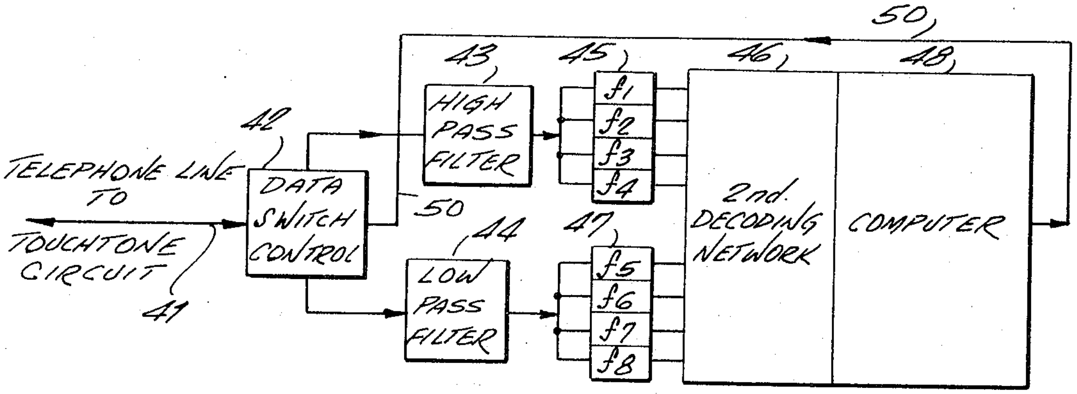
FIG. 4 is a schematic diagram, in block form, showing the main components of the system at the bank.

The frequencies generated by the touch-tone action are also sent over a telephone line 38 to a telephone exchange 40 which responds to the switching instructions and selects the correct line 41 to a computer control system at the bank. This system (FIG. 4) includes a data switch control circuit 42, a high pass filter 43, similar to filter 54, a low pass filter 44 similar to filter 53, four notch filters 45 similar to filters 56, and four notch filters 47 similar to filters 58. A second decoding network 46 is also provided for translating the double frequency combinations into digits from 0 to 9 and instructions for operation. The computer control system is identical to the first decoding system and only one of the systems will be described in detail. This invention is not concerned with the touch-tone generating system in the telephone set 10, the telephone exchange 40, nor the computer 48 in the bank, these units being well established in the art and well known.

Referring again to FIG. 4, the signals from the telephone exchange carry information to a data switch control unit 42 which applies the generated tones to a high pass filter 43 and to a low pass filter 44, these filter units being used for the separation of generated tones into two groups and being described generally in several patents, one of which is U.S. Pat. No. 3,076,059, issued Jan. 29th, 1963, to L. A. Meacham et al. The tones passing through the high pass filter 43 are applied to four additional filters 45 and then applied to a decoding network 46. The tones passing through the low pass filter 44 are applied to a similar group of four tonal filters 47 and then applied to a second decoding network 46. The decoding network 46 is connected to the computer storage and arithmetic unit 48 which contains all the depositors accounts and the accounts of all the stores which may sell articles to depositors. The computer storage unit 48 is not a part of this invention and for this reason need not be described in detail. The output of the computer 48 is applied to a conductor 50 which sends its information to circuit 42 and to the telephone line 41 for replying to the request received from the subscriber telephone receiver 10.

FIG. 5 is a side view of the receiver set shown in FIG. 1. In FIG. 5 the receiver-transmitter hand set 24 has been placed in the data receiving position with the sound transducer adjacent to a pickup coil 36 in well 22. In this view some of the details of the printing device are shown.

Figure 6:
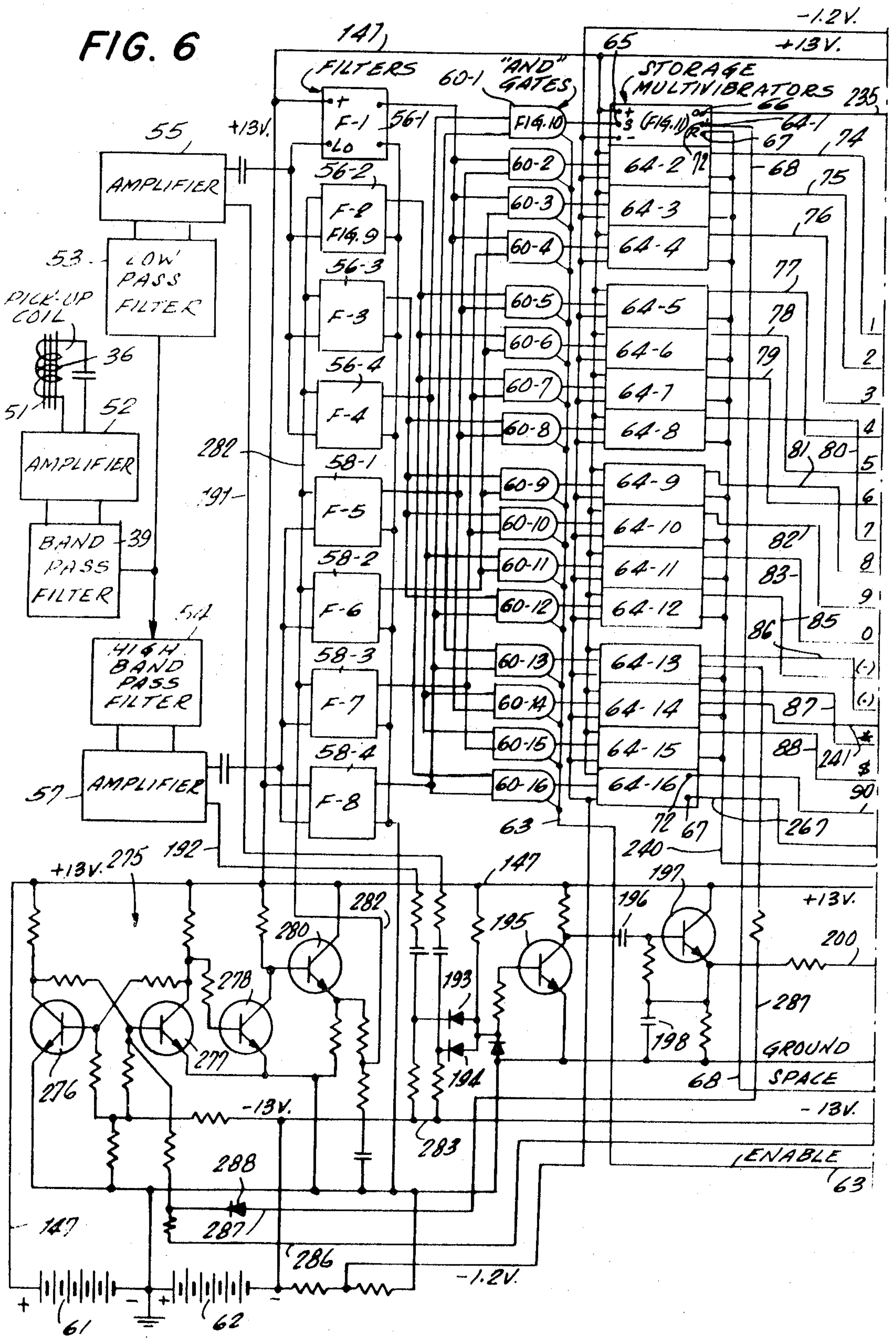
FIGS. 6, 7, and 8, when placed side by side, are a schematic diagram of connections showing the entire circuit of the receiver pickup unit. Three amplifiers and three filter circuits are shown in block form. Also, the timing and control circuits, and the printing mechanism are shown in block.
Figure 7:
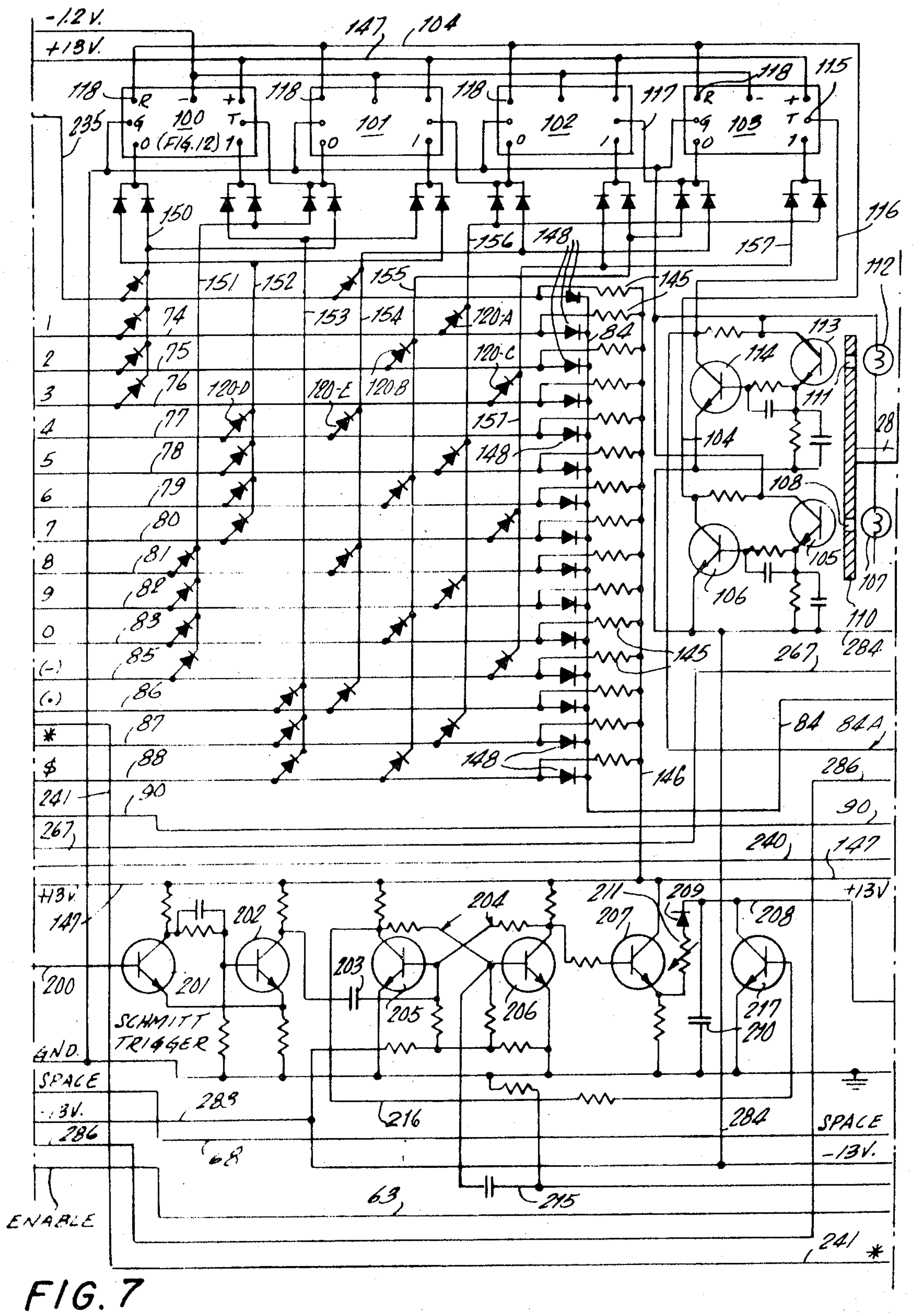
Figure 8:
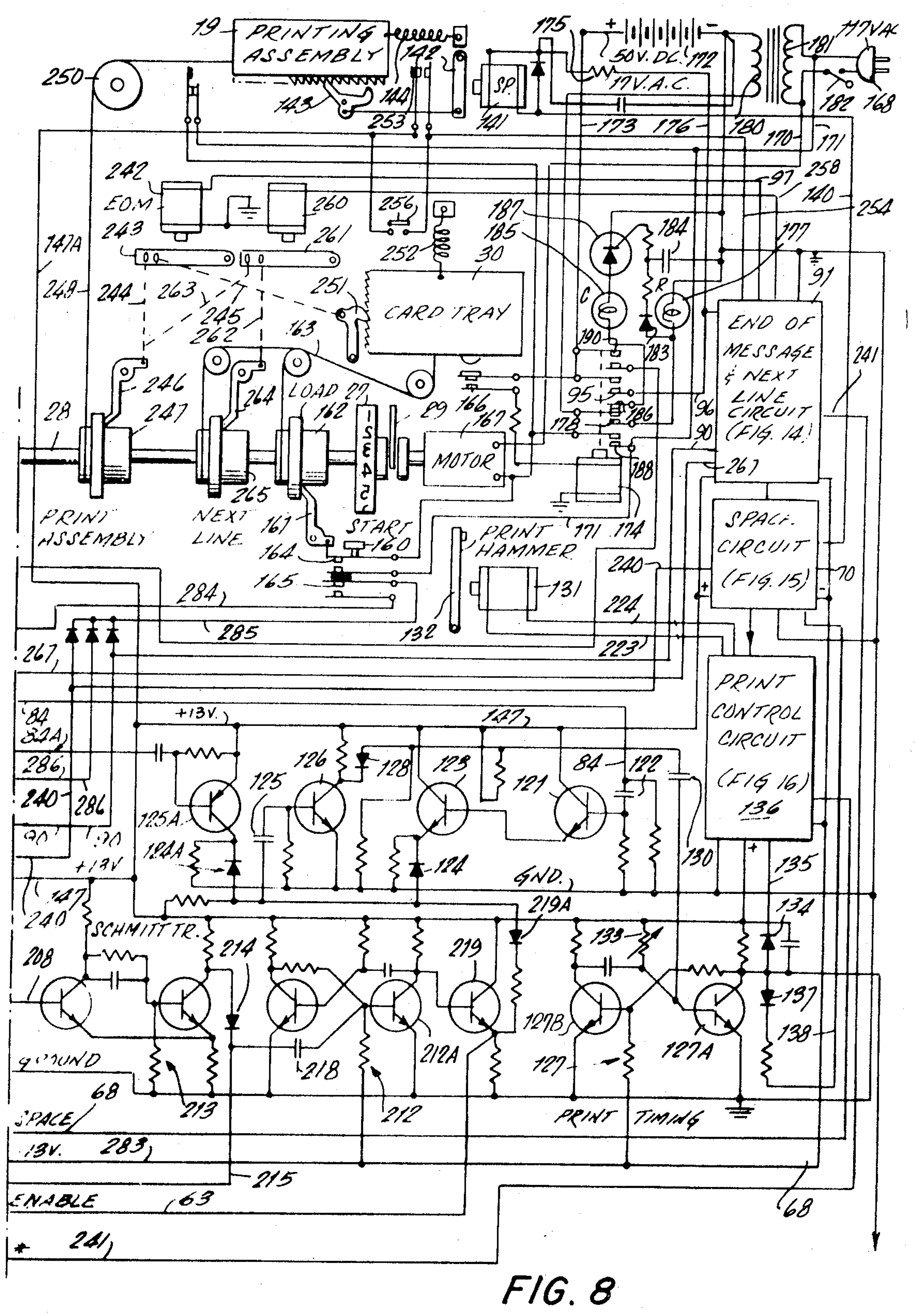

FIGS. 6, 7 and 8, when placed side-by-side show a schematic diagram of connections of the entire electric decoding and printing circuit but showing many of the circuit elements in block form. This circuit receives coded tonal pulses from the computer, decodes the pulses, and then controls the printing mechanism to print a line of digits on the card 26 in the space 32 to complete the transaction and certify that funds have been transferred at the bank.

Pickup coil 36 may be wound on an iron core 51 for greater efficiency. The coil 36 is connected to the input terminals of an amplifier 52 and the output terminals of the amplifier are connected to a band pass filter 39 and then to both the low pass filter 53 and the high pass filter 54. The output of the low pass filter 53 is applied to another amplifier 55 and then sent to a first group of sharply tuned filters 56-1, 56-2, 56-3, and 56-4, each of which is arranged to pass only a narrow band of frequencies. In a similar manner, the output of the high pass filter 54 is applied to an amplifier 57 and then sent to four sharply tuned filters 58-1, 58-2, 58-3, and 58-4, each of which passes only a narrow band of frequencies.

The output pulses from filters 56-58 are applied to 16 "AND" gates 60-1 through 60-16, each of these gates having two input connections and operating to deliver an output voltage only when input current pulses are received on both input lines. It is apparent from the circuit of FIG. 6 that each filter circuit 56 is connected to four gates 60-1 through 60-4. Each of the gates 60 will be opened only when a combination of two frequencies are received by the pickup coil 36. These two frequency waves are separated by the filter circuits and then one and only one of the 16 gates 60 is opened. All the gates 60 are supplied with a source of positive and negative voltage shown in FIG. 10, but omitted in FIG. 6. The current supply to gates 60 may be derived from batteries 61 and 62 or from any other convenient power supply. There are times when all the gates are closed. This is accomplished by supplying a voltage pulse over an enable conductor 63 from a control circuit (see FIG. 8) designed to protect the circuit from noise and transient disturbances.

Adjacent each gate 60 is a bistable multivibrator forming a series 64-1 through 64-16. Each of these multivibrators, sometimes called flip-flops, has a "set" terminal 65, (see FIG. 11) an output terminal 66, and a reset terminal 67. Each of the set terminals 65 are connected to a gate so that, when the gate is opened, an operating pulse is transferred to the associated flip-flop and its conductance is transferred to the left side, increasing the potential of the output terminal 66 and applying a positive voltage to the output conductor. Each of the sixteen output terminals is connected to a conductor which supplies its positive voltage pulse to the printing control circuit or to the space circuit. Another control (see FIG. 14) receives a pulse from one of the multivibrators (64-14) to end the message and normalize the circuits. The operation of these circuits will be described later. Multivibrator 64-1 has its output conductor 68 connected to a space circuit 70 (see FIG. 15) and other control circuits to cause the printing wheel 27 and its associated components to move one space without printing a character.

The digit multivibrators 64-2 through 64-11 are for printing digit characters from 1 through 9 and 0. The output terminals of these circuits are connected to conductors 74 through 83 which run to a diode matrix (see FIG. 7). Multivibrators 64-12, 64-13, 64-14, and 64-15 control the printing of a dash (–), a period (.), an asterisk (*), and a dollar sign ($), respectively. The output terminals of these circuits are connected to conductors 85, 86, 87, and 88, all of which run to the diode matrix. Multivibrator 64-16 has two output terminals 72 and 67. Terminal 72 is connected to the collector electrode of the right hand transistor (see FIG. 11) while terminal 67 is the usual reset terminal. Output terminal 72 (of circuit 64-16) is connected by conductor 90 to an "end of message" circuit 91 shown in detail in FIG. 14. The functions of this circuit 64-16 will be described when the operation of the system is disclosed.

The above described circuits all receive their operating pulses from a pickup coil 36. Other coupling means such as a direct connection to the telephone line or an acoustic coupler may be used. In the latter case, a microphone is connected to the input terminals of amplifier 52.

DECODING MATRIX

Figure 12:
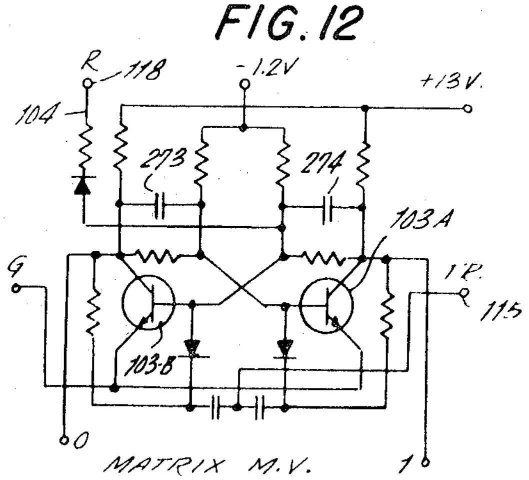
FIG. 12 is a schematic diagram of connections of each of the four multivibrators associated with the diode matrix, in FIG. 7.
Figure 13:
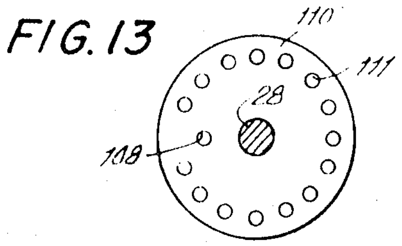
FIG. 13 is a side view of the synchronizing wheel shown in FIG. 7.

Synchonism between the decoding circuits and the printing wheel is provided by a diode matrix and a series of four multivibrators, shown in detail in FIG. 12. FIG. 7 shows the diode matrix layout with horizontal conductors connected to the storage multivibrators 64 and the vertical conductors connected to the matrix multivibrators 100, 101, 102, and 103. The latter circuits are connected in series in the same manner as a counting system with a single input terminal 115. Counter impulses are received from a photosensitive transducer 113 which is activated successively by light flashes received from lamp 112 through holes 111 in a wheel 110 turned by shaft 28 which also supports the printing wheel 27. Wheel 110 (see FIG. 13) contains 16 holes, 15 of which are spaced so as to transmit light from lamp 112 and one hole 108 closer to the center of rotation for passing light from lamp 107 to activate a second photosensitive transducer 105.

Light flashes from lamp 112 are transformed into electrical pulses by transducer 113, amplified by transistor 114 and then a negative pulse is applied to the input terminal 115 over conductor 116 to transfer conductance from the right-hand transistor 103A to the left-hand transistor 103B (see FIG. 12). When a second pulse is received conductance is transferred back to transistor 103A and, at the same time, a triggering negative pulse is sent from the output terminal of circuit 103 to circuit 102 over conductor 117. Circuit 102 is identical to circuit 103 and conductance of its transistors is transferred in a similar manner. During the second activation of circuit 102, a pulse is sent to circuit 101 and after 15 actuating pulses from transistor 114, all the multivibrators are conductive on their left side. The 16the pulse, from transistor 106 over conductor 104 is applied to all the reset terminals 118 and all the circuits are normalized, ready for another printing cycle.

The above described "counting" operation applies a series of voltages to the vertical conductors in the matrix (see FIG. 7). When conductance is on the right side, terminal 1 is at a low voltage and terminal 0 is at high voltage (+13 volts). A low voltage applied to a vertical conductor results in no conductance through any of the diodes 120 cross connected between the vertical conductor and the connected horizontal conductor. In a complete series of "counts" resulting from a single turn of wheel 110 there are 16 combinations of applied voltages given to the vertical conductors, thereby providing 16 timed pulses sent over conductor 84 to the base electrode of transistor 121 through blocking capacitor 122. The printing pulse is amplified by transistor 123 and then sent through diode 124, a capacitor 125 to transistor 126 and to the base electrode of transistor 127A by means of diode 128 and capacitor 130. Circuit 127 is for timing the printing action and allows for the inductance of a printing solenoid 131, and the inertia of a printing hammer 132. The timing action can be made adjustable by varying one of the resistors 133. A printing control pulse is sent through diode 134 and over conductor 135 to the print control circuit 136. At the same time a portion of the same pulse is sent through diode 137 and over conductor 138 to the space circuit 70. The printing control circuit operates solenoid 131 and hammer 132 to print a desired character on the card in the printing assembly 19. The space circuit 70 sends an operating pulse over conductor 140 to winding 141 to actuate armature 142 and operate an escapement pawl 143 thereby permitting spring 144 to pull the printing assembly 19 one character space to the right to be ready for the next printing operation.

It should be noted that all the horizontal conductors in the matrix (see FIG. 7) are connected through resistors 145 to a common supply line 146 which is connected to conductor 147 and the positive terminal of the power supply 61. When the horizontal conductors in the matrix 74 are not actuated by signals coming from the multivibrators 64-1 through 64-16, they are maintained at ground potential. When any one of the multivibrators is actuated, the horizontal conductor connected to it is given a positive potential. The voltage is transmitted to conductor 84 but no direct current flows through the conductor because of blocking capacitor 122.

The operation of the diode matrix in connection with the circuits is as follows: Let it first be assumed that all the circuits have been reset by the beam of light from lamp 107 through hole 108. All four multivibrators are now conducting on the right side and current flows through all the vertical conductors except the first 150 and the fifth 154. However, there is no current pulse sent through any of the diodes 148 to conductor 84 because there is sufficient current drain through at least one of the cross connected diodes 120 to maintain all horizontal conductors at a low potential. For example, conductor 74 is connected through diode 120-A to the 1 terminal in circuit 103 which is at low potential. Conductor 75 is connected by diode 120-B to the 1 terminal in circuit 102 and conductor 76 is connected by diode 120-C to terminal 1 in circuit 103. All the other horizontal conductors are connected in a similar manner.

Now let it be assumed that the wheel 110 moves three of its holes past lamp 112 and then permits light to shine through the fourth hole 111. The four pulses applied to the four multivibrator circuits have switched conduction four times leaving conduction in circuit 103 on the right side. The two pulses from circuit 103 have switched conduction of circuit 102 twice leaving conduction on the right side. The single pulse from circuit 102 have switched conduction of circuit 101 once, leaving it on the left side. All the multivibrators are the same as before except circuit 101 has its "o" terminal at low voltage and its "1" terminal at high voltage. All the horizontal conductors are connected to low voltage terminals except conductor 77(for printing a "4"). The only two diodes 120-D and 120-E are connected to high voltage terminals, there is no current drain, and when a positive current pulse is applied from storage multivibrator 64-5, it continues through diode 148 to conductor 84, the printing timing circuit 127, the print control circuit 136, and solenoid 131 to actuate hammer 132 to strike the "4" character on print wheel 27 and print that numeral on the card 26.

CARD TRAY AND MOTOR CONTROLS

As mentioned above, the system is started by placing a card 26 in its tray or holder 30 and then depressing a start button 160 (See FIG. 8). This action operates a pawl 161 releasing a one-revolution clutch 162 which turns and pulls a cord 163 to lower the card tray to a printing position. At the same time, contacts 164 and 165 under the start button are closed and contacts 166 under the card tray are closed. Contacts 164 start an alternating current motor 167 by completing a circuit which may be traced from the power plug 168, over conductor 170, to the motor 167, then through contracts 164 under the start button 160, then over conductor 171, and back to the other terminal on the power plug. This circuit starts the motor 167.

When contacts 166 under the card tray 30 are closed, a circuit is completed which may be traced from the positive terminal of a source of direct current power 172, over conductor 173, through contacts 166 and a limiting resistor, to the winding 174 of a relay, to ground and the negative terminal of source 172. This action operates the relay, closes four pairs of contacts and opens one pair. The closure of contacts 95 completes a supply circuit which can be traced from the positive terminal of the source of potential 172, over conductor 173, through contacts 95, then over conductors 96 and 176, through resistor 175 to the space magnet winding 141, and then to the space circuit 70. Conductor 96 is also connected to the "End of Message" circuit 91 and (see FIG. 14) ) the anodes of two silicon controlled rectifiers 93 and 257.

In order to tell the operator that the system is ready for a printing operation, a ready lamp 177 is provided. This lamp lights only when the relay is in its operated condition and contacts 178 are closed. The lamp 177 and contacts 178 are connected in series with a secondary winding 180 of a transformer whose primary winding 181 is connected to the power lines in series with a main power switch 182. Lamp 177 is in parallel with a diode 183 and a capacitor 184. During the operation of the circuit, capacitor 184 is charged to a direct current potential but the "complete" lamp 185 cannot pass current because contacts 186 are open. At the completion of the printing cycle when the relay is normalized and contacts 186 are closed, lamp 185 is lighted because a series connected silicon controlled rectifier 187 is maintained conductive by the charge on capacitor 184. As soon as the charge leaks off, the rectifier is made nonconductive and the lamp is extinguished.

A third pair of contacts 188 is connected directly across the "start" contacts 164 but in series with the motor 167. Closure of contacts 188 insures that the motor 167 will continue to run as long as the relay is actuated. A fourth set of contacts 190 connects the direct current source of potential 172 to the two lamps 107 and 112. As long as the relay is operated, the lamps adjacent to the wheel 110 remain lighted and provide light flashes for transducers 105 and 113.

INPUT NOISE CONTROL CIRCUITS

Many of the printing signals are generated in the telephone set positioned directly above the decoding and printing compartment 21. However, the signals from the computer must be sent over a first telephone line 41 to the exchange and then over a second line 38 to the first decoding network 59 and printer control circuit 37. The telephone lines carrying the printing signals are often subjected to inductive noise which may result from switching transients, adjacent phone conversations and power line currents. It has been found that these noise sources are either of short duration or, if sustained, the frequency is varied. In order to protect the printing circuit from these unwanted signals, a time-filter circuit is employed. This circuit monitors the incoming signals by first passing the positive signal currents through two diodes, "AND" gates, and then applying the rectified currents to a chargeable capacitor until a predetermined voltage is obtained. Then, after a short delay, during which time the "enable" voltage is removed from the "AND" gates 60, the signals are sent to the printing circuit.

The control circuit which monitors the input signals is shown at the bottom of FIGS. 6, 7, and 8 and includes multivibrator 275, transistors 195, 196, and two Schmitt triggers. When the double frequency signals retain their frequencies for the predetermined time interval, a voltage is applied to the "enable" conductor 63 by transistor 219 and the "AND" gates 60 are opened so that the signals may be sent to the storage vibrators 64.

The details of the noise control circuits are included in a copending application Ser. No. 806,515 filed Mar. 12, 1969, by Arnold M. Wolf and John G. Richter.

PRINT CONTROL CIRCUIT

Figure 16:
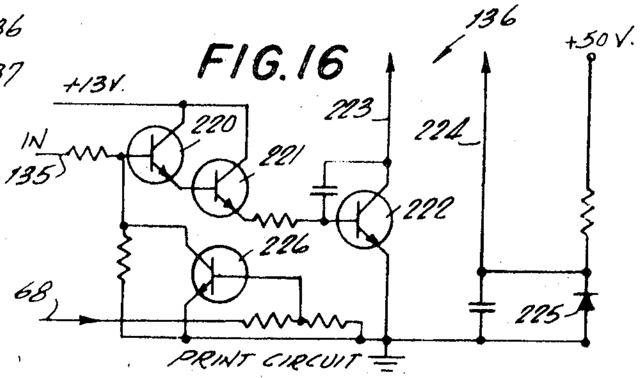
FIG. 16 is a diagram of connections of the print hammer control circuit.

The print control circuit 136 is shown in block in FIG. 8 and in detail in FIG. 16. The timed printing signal is received over conductor 135 and is applied to two transistors 220 and 221, coupled together to form a high impedance Darlington circuit. The output of this combination is applied to an amplifier transistor 222, the collector of which is connected to conductor 223 and the print solenoid 131 (see FIG. 8). The return conductor 224 is connected to the 50-volt supply line (FIG. 16) in parallel with a diode 225 for bypassing inductive transients generated by coil 131.

The print hammer 132 (FIG. 8) is operated once each printing cycle except when a space is called for. During this time the printing input circuit is short circuited to ground by a transistor 226 (FIG. 16) having its emitter connected to ground, its base connected through part of a voltage divider to conductor 68 and the top storage multivibrator 64-1 which is activated each time a space is desired. The pulse sent over conductor 68 is applied to the base of transistor 226 making it conductive and short circuiting the input terminals of the printing circuit.

SPACE CONTROL CIRCUIT

Figure 15:
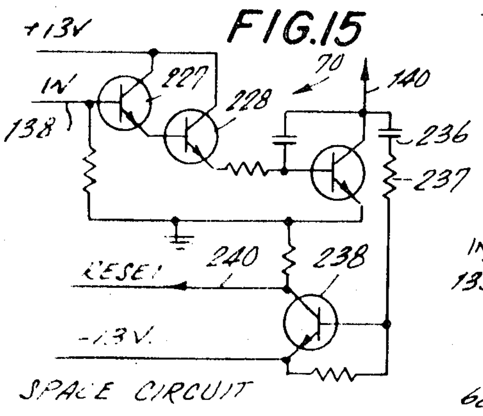
FIG. 15 is a diagram of connections of the "Space" control circuit shown in block in FIG. 8.

The space control circuit 70 is shown in detail in FIG. 15. The input to this circuit includes tow transistors 227 and 228 coupled together to form a high impedance Darlington circuit, similar to transistors 220 and 221 in the print circuit. The space signal is received over conductor 138 (when a character is printed) and is applied to the base of transistor 227. The result is an output pulse sent over conductor 140 to the space magnet 141 which actuates armature 142 and escapement pawl 143 to move the printing assembly one space. A space operation must be made each time a character is printed and for this reason the output pulse of transistor 127A is divided into two portions, one sent over conductor 135 to the print circuit 136 and the other sent over conductor 138 to the space circuit 70.

When a space operation is desired without printing a character, "AND" gate 60-1 is opened and storage multivibrator 64-1 is activated, thereby sending a signal to the diode matrix over conductor 235. At the start of the printing cycle, when the matrix multivibrators are normalized, the first vertical conductor 150 and the fifth vertical conductor 154 are provided with positive voltages so that the cross connected diodes to conductor 235 do not short out the signal pulse from circuit 64–1 and, at this time, the signal pulse is transmitted through diode 148, then over conductor 84 to transistor 121 (FIG. 8). The pulse is amplified, as described above, by transistors 123 and 126 and then sent through diode 128 and capacitor 130 to the printing monostable multivibrator 127 to produce the same type of printing and spacing operation as described previously. However, there is no printing operation, this action being eliminated by the following circuit.

When the storage multivibrator 64-1 (FIG. 6) is activated, a second pulse is sent from terminal 72, over conductor 68 to the printing control circuit 136 (FIG. 8). Referring now to the detail circuitry shown in FIG. 16, the pulse received over conductor 68 makes transistor 226 conductive and the printing signal received over conductor 135 is short circuited to ground so that no pulse is sent over conductor 223 to solenoid 131.

A short time interval after the space circuit (FIG. 15) is activated and sends a signal over conductor 140 to move the printing assembly 19, a pulse is transmitted over a delay circuit including capacitor 236 and resistor 237. This pulse builds up slowly and, after a few milleseconds, changes the voltage on the base electrode of transistor 238 to make it conductive and then send a reset pulse over conductor 240 to all the storage multivibrators 64 (FIG. 6) and reset or normalize the one which has been actuated. This action completes the space operation. It should be noted that the normalizing or reset operation occurs at the end of each spacing and printing operation.

END OF MESSAGE CIRCUIT

The depression of the START button 160 (FIG. 8), as noted above, activates all the operating circuits to print the desired characters. One of the results of the start operation is the activation and latching of the relay having winding 174. Another is the start of motor 167 and the sequential activation of the matrix multivibrators 100, 101, 102, and 103. When the message is complete, these operations and others must be terminated and their circuits normalized. The end of the message is terminated by a signal which includes two frequencies each passing through filter circuit 56-4 and filter circuit 58-1, respectively. These signals then pass through "AND" gate 60-14, activate storage multivibrator 64-14 and a positive pulse is thereby sent over conductor 87 through the diode matrix for timing. The timed pulse is then transferred by conductor to the print circuit as explained above in connection with the description of the printing control 136.

Figure 14:
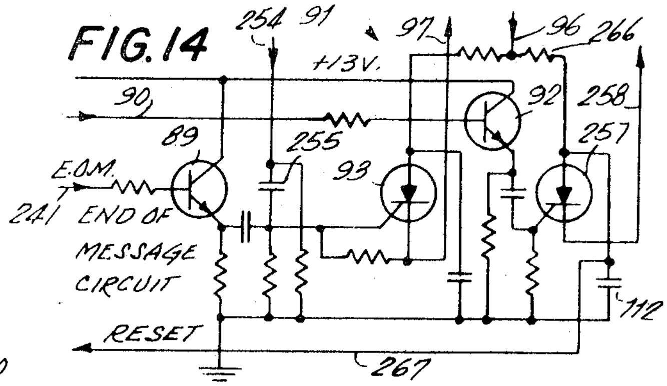
FIG. 14 is a schematic diagram of the "End of Message" and "Next Line" circuit shown in block form in FIG. 8.

A portion of the pulse from circuit 64-14 is sent over conductor 241 (FIGS. 7 and 8) to the end of message circuit 91. Details of this circuit are shown in FIG. 14 where input conductor 241 is connected to the base of transistor 89, with the emitter coupled to the firing electrode of a controlled rectifier 93. This rectifier has its anode connected to a common supply conductor 96 which is connected to the positive terminal of battery 172 in series with relay contacts 95. The cathode of rectifier 93 is connected by conductor 97 to a magnet 242 which operates an armature 243 and pulls two cords 244 and 245. The first cord 244 operates a pawl 246 and trips a 1 revolution clutch 247 to pull another cord 248 which passes over pulley 250 and moves the printing assembly 19 back to its original starting position. The second cord 245 moves a ratchet pawl 251 out of engagement with teeth on the card tray 30 and a spring 252 pulls the card tray up to its loading position and, at the same time, releasing the card.

There may be times when the operator at the bank sends a message which is too long for the capacity of the card. In this case the printing assembly is advanced to the right until the limit is reached and a pair of limit contacts 253 are closed. These contacts complete a circuit which may be traced from the positive 13 volt supply line 147 (FIG. 8) over conductor 147A to the contacts 253, then over conductor 254, through a blocking capacitor 255 to the controlled rectifier 93. This action again terminates the printing action as described above. A manual switch 256 is also provided so that the operator in the store may stop the printing action and normalize the circuits. The switch contacts are connected in parallel across contacts 253.

There are provisions in the circuit shown for a "next line" operation. This is not always necessary and for many banking transfer of funds, a single line of characters, as shown in FIG. 2, is sufficient. When a second line of characters is desired, a signal composed of two frequency components is sent to the amplifier-filter circuits, filters 56-2 and 58-4 send signals to "AND" circuit 60-16 and an output signal is sent over conductor 90 to the "end of message" circuit 91 (FIGS. 8 and 14). Conductor 90 is coupled to the base of transistor 92 and, when activated, the emitter electrode sends a pulse through a blocking capacitor to the firing electrode of a second controlled rectifier 257 having its anode coupled to conductor 96 and the power supply and its cathode connected to conductor 258 which leads directly to magnet 260 (FIG. 8). When current is received by magnet 260, its armature 261 is moved upward and cords 262 and 263 are pulled, thereby unlatching pawls 264 and 246 to release one revolution clutches 247 and 265. Clutch 247 pulls the print assembly to the left as before to start the next line and clutch 265 pulls the card tray to a new location so that the next line can be printed on a blank portion of the card.

At the end of the "end of message" operation when controlled rectifier 257 is made conductive, the voltage drop across resistor 266 (FIG. 14) causes a voltage pulse to be sent over conductor 267 to the reset terminal 67 on storage multivibrator 64-16. The other storage multivibrators are reset after each space operation by a voltage sent from the space circuit over conductor 240.

The holding circuit which holds the relay in its activated condition during the printing operations is in series with the pair of contacts 166 which were closed by the card tray being lowered into printing position. At the end of the printing operation, when armature 243 is operated, the card tray is released and is moved to its unloaded position, opening contacts 166 and thereby breaking the holding circuit. The relay is normalized, contacts 190, 95, 178, and 188 are opened and contacts 186 are closed. Contacts 186, as described previously, complete a circuit through indicator lamp 185 and controlled rectifier 187 to show a COMPLETE signal on the panel of container 21 (FIG. 1). The lamp 185 is lighted for approximately 30 seconds and then its current is cut off automatically when capacitor 184 is discharged.

Figure 9:
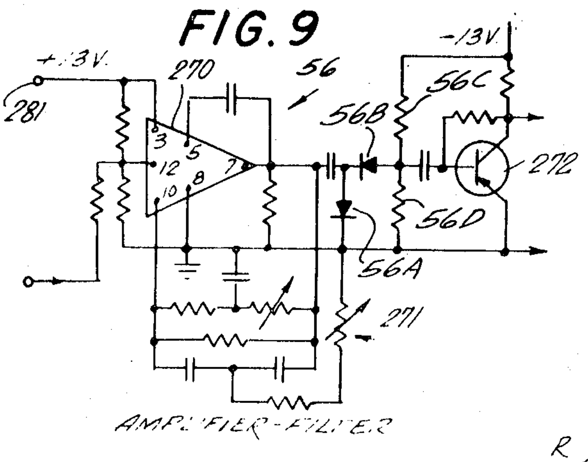
FIG. 9 is a schematic diagram of the amplifier-filter circuit shown in block in FIG. 6.

The detailed circuits shown in FIGS. 9, 10, 11, and 12, indicate the actual wiring of these units as employed in a workable system. There are many variations of these units which may be used and the invention is not dependent upon the details of construction as shown. FIG. 9 shows a commercial integrated amplifier 270 used in conjunction with a double T filter 271 and coupled to a clamping diode 56A, a slipper section comprising a diode 56B and resistors 56C and 56D. An output amplifier stage which includes transistor 272 is added to increase the current amplitude.

Figure 10:
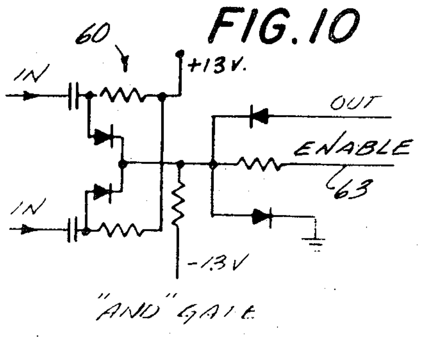
FIG. 10 is a schematic diagram of connections of each of the 16"AND" gates shown in block form in FIG. 6.

The "AND" gate 60, shown in FIG. 10, is only one of many similar circuits which can be used to select the proper combination tonal signal frequencies and transfer an output signal to the associated storage multivibrators 64. The construction of this "AND" circuit 60 is based on the requirement of an enable signal applied over conductor 63 which opens the gate to permit an output signal to pass through after transistor 219 is activated by the two-tone signal.

Figure 11:
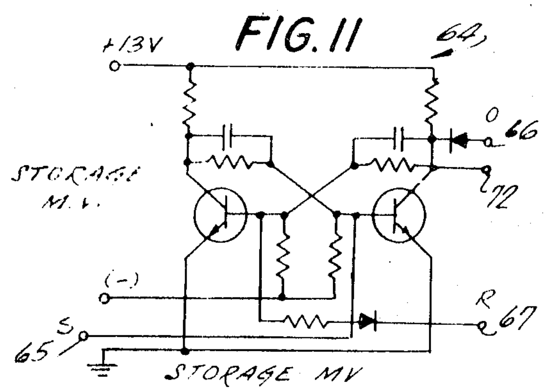
FIG. 11 is a schematic diagram of each of the 16 storage multivibrator circuits shown in block form in FIG. 6.

FIGS. 11 and 12 show the details of two bistable multivibrators, each including two transistors. The storage multivibrator 64 is a simplified design because it is activated by a signal applied to terminal 65, to produce a positive output level at terminal 66, then reset to ground potential by a negative pulse applied to terminal 67. No other action is necessary. The multivibrator shown in FIG. 12 is more complicated because the activating or triggering pulse applied to terminal 115 must transfer conductance from one transistor to the other a number of times during a printing operation. The action must be fast since the transfer of conductance must occur during the time one character on printing wheel 27 is replaced by the next character. In order to speed the action, capacitors 273 and 274 have been added. These capacitors, however, are not large enough to produce a free running generator. Variations of this circuit can be used for this operation.

Figures 17, 18, 19, 20:
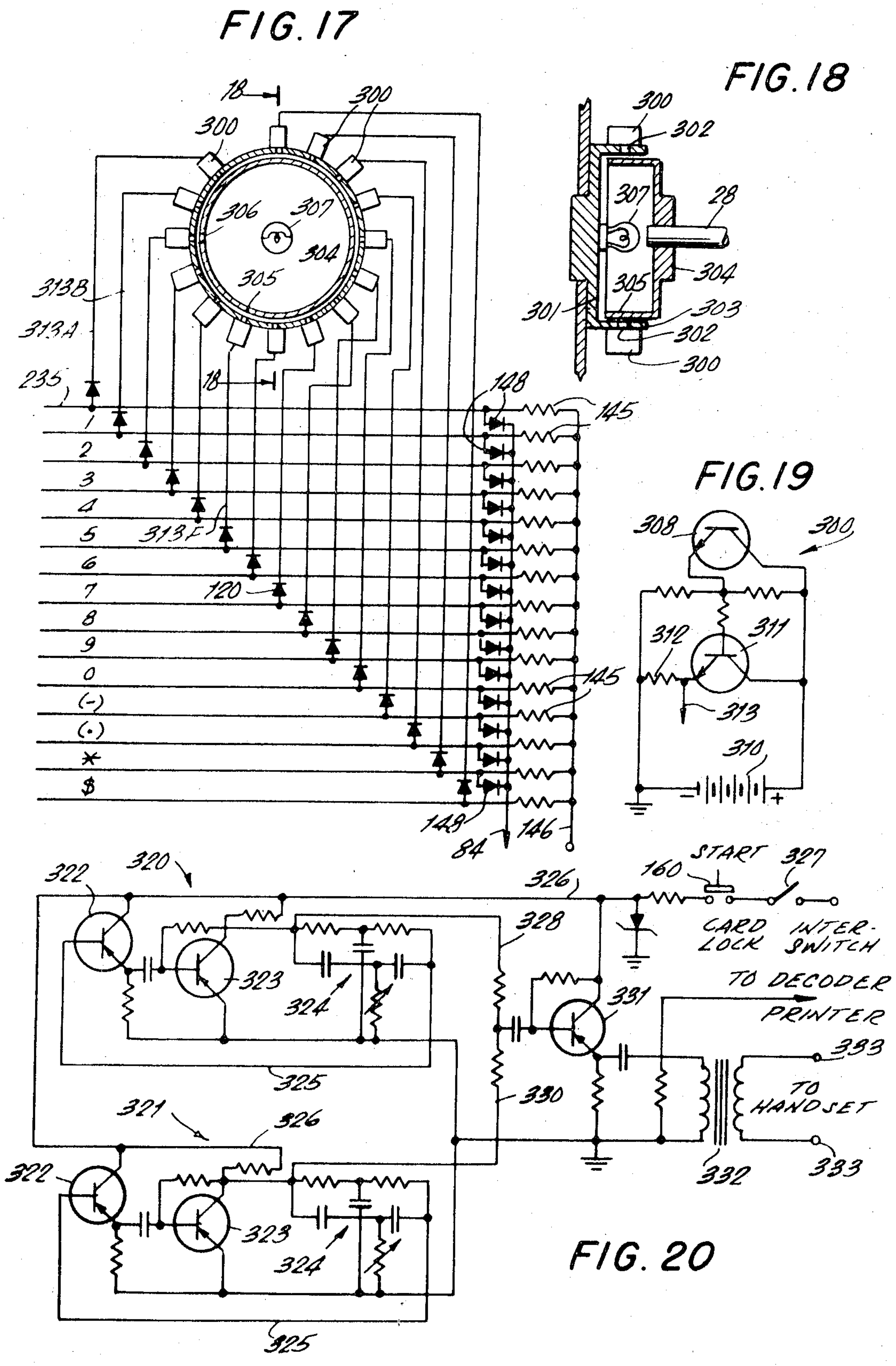
FIG. 17 is a diagram of connections of an alternate form of matrix.
FIG. 18 is a cross sectional view of the alternate apertured wheel shown in FIG. 17 taken on line 18—18.
FIG. 19 is a diagram of connections of a photosensitive transducer for use with the apertured wheel shown in FIGS. 17 and 18.
FIG. 20 is a diagram of connections of an additional protective filtering circuit.

An alternate form of diode matrix is shown in FIG. 17. This simplified circuit can only be used when 15 successive pulses are applied to the vertical matrix conductors in timed relationship with the printing wheel. In FIG. 17, the operation pulses are supplied by 15 photosensitive transducer circuits 300 secured to a cup shaped stator 301 having 15 holes 302 formed in its flange portion 303. The circuits are equally spaced around the flange except for one blank portion. Cooperating with stator 301 is a totor 304, also cup shaped and having a flange 305 which fits closely inside the flange 303 of the stator. The flange 305 is provided with a single hole 306, in the same rotary plane as holes 302. Rotor 304 is secured to shaft 28 (see FIGS. 7 and 8) which also carries the print wheel 27 and is turned by motor 167. It is obvious that rotor 304 provides the same function as the apertured wheel 110 shown in FIG. 7.

A lamp 307 is placed in axial alignment with the shaft 28 and in the plane of the holes 302. As the rotor 304 turns, light flashes pass through the rotor hole 306 and the stator holes 302, thereby providing 15 successive light pulses to all the 15 photosensitive circuits.

Each of the photosensitive circuits 300 (see FIG. 19) includes a photosensitive transducer 308 which in this case is a semiconductor unit although other photosensitive transducers can be used. The transducer 308 is connected to a battery 310 which sends current through the collector and emitter electrodes only when light is incident on the semiconductor surface. Transducer 308 is direct coupled to a transistor 311 which is biased by a voltage divider to be normally nonconductive. When light activates transducer 308, it conducts and alters the bias on transistor 311 to make it conductive.

When no current flows from battery 310 through resistor 312, the potential of output conductor 313 is at ground potential. When the transistor conducts, current flows through resistor 312 and its voltage drop raises the potential of conductor 313 to a definite positive value. The result is a positive pulse applied over conductor 313 every time a light flash is applied to transducer 308.

The operation of the matrix circuit is as follows: When light is not incident on a transducer 308, the potential of all the vertical conductors 313 is at zero or ground potential. All the horizontal conductors in the matrix are connected to a positive potential source by way of conductor 146 (see similar connection in FIG. 7) and resistors 145. However, a positive pulse applied to any of the horizontal conductors cannot be transmitted to conductor 84 because all horizontal conductors are effectively grounded through diodes 120. When a light flash is incident on any of transducers 308, its associated vertical conductor is made positive, but there is still no output pulse sent over conductor 84 because of the blocking action of diode 120.

If a positive pulse is applied to one of the horizontal conductors at the same time a positive potential is applied to a vertical conductor, then a positive pulse will be sent through one of the isolating diodes 148 to conductor 84 and the printing mechanism. The hole 306 in the rotor is synchronized with the print wheel so that a positive potential on any one of the horizontal conductors results in the printing of a character identified with that conductor.

The circuit shown in FIG. 20 is another control circuit which can be omitted from the general system but its use can eliminate false starts and recording errors. Its main purpose is to prevent the computer from accepting data signals from the subscriber set when a data card is not properly placed in the card tray. As soon as the card is properly placed, a two tone signal is sent to the computer, unlocking its input circuit.

The circuit includes two oscillators 320 and 321, each tuned to a definite frequency by a double bridge type filter. Each oscillator includes two transistors 322 and 323 and a filter combination 324 which determines the frequency of oscillation. Feedback connection from the filter 324 to the base electrode of transistor 322 is made by conductor 325. The circuits start to oscillate when the collector supply conductor 326 is connected to a −13-volt supply. As shown in FIG. 20, a "start" switch 160 and a card lock switch 327 must both be closed before the oscillators can function. When the card is properly placed and the start button depressed, two alternating currents of differing frequencies are generated by oscillators 320 and 321 and combined by output conductors 328 and 330. The combination signals are amplified by transistor 331 and applied to the telephone line and the bank's computer by a transformer 332. The transformer terminals 333 may be connected directly to the telephone line or they may be coupled inductively or acousticly to one of the elements of the subscriber hand set in order to send both currents to the computer. A receiving set, similar to circuits 56 and 60 (see FIG. 6), receives the signals and, if the frequencies are correct and if they occur at the same time, the computer is controlled to start sending data to the printing assembly under the subscriber set.

Having thus fully described the invention, what is claimed as new and desired to be secured by Letters Patent of the United States is:

1. A telephone transaction system for transferring funds from one account to another comprising:

a. a telephone subscriber set for joint operation by a first person representing a purchaser and a second person representing a seller, said subscriber set including a plurality of manually operable keys each for transmitting signals, each of said signals comprising an encoded pair of distinctive alternating currents of different frequencies;

b. a first decoding network connected to the subscriber set for receiving said pairs of alternating current signals and for decoding the signals into digits and directions for operating a printer, said first decoding network including a plurality of back biased diodes which are selectively controlled by a series of pulse generators to pass an electrical signal synchronized with a timing mechanism;

c. printing means at the subscriber set for printing symbols representing the decoded signals;

d. a second decoding network, similar to the first, positioned at a remote position and coupled to the subscriber set for receiving said pairs of alternating current signals and for decoding the signals;

e. a digital computer for recording amounts of money deposited by a plurality of purchasers and a plurality of sellers, said amounts being transferable responsive to signals received by the computer from the decoding network;

f. and an automatic data switch connected between the telephone subscriber set and the second decoding network for sending signals from the set to the second decoding network when opened in one direction by a start signal from the set, and for sending signals from the computer to the subscriber set when opened in a reverse direction by an end-of-message signal from the subscriber set.

2. A transaction system as claimed in claim 1 wherein an auxiliary container is positioned under the subscriber set, forming a support therefor; said container including a plurality of filter circuits for separating the double frequency signals, said first decoding network, and the printing means.

3. A transaction system as claimed in claim 1 wherein said signals include a total of eight alternating currents having frequencies differing from each other, said currents transmitted in pairs to designate sixteen indicia which may designate digits, symbols, or operating instructions.

4. A transaction system as claimed in claim 1 wherein said printing means includes a card holder mounted adjoining the subscriber set, said card holder for receiving a card on which the results of a transaction are to be printed, said card holder movable to an operating position when a printing operation is started.

5. A transaction system as claimed in claim 2 wherein a roll of carbon paper and a roll of record paper are mounted in said auxiliary container and adjoining said card holder for recording all of the transactions on a single record sheet.

6. A transaction system as claimed in claim 2 wherein connections between the telephone set and the computer pass through a telephone exchange.

7. A transaction system as claimed in claim 2 wherein the subscriber set may be connected to the computer by a start signal from the "touch tone" dialing system which operates to open said dial switch in one direction.

* * * * *